United States Patent
Williams (10) Patent No.: US 7,325,568 B2
(45) Date of Patent: Feb. 5, 2008

(54) SPRINKLER VALVE MANIFOLD

(76) Inventor: Mark Alan Williams, 18432 Tribune St., Northridge, CA (US) 91326

(*) Notice: Subject to any disclaimer, the term of this patent is extended or adjusted under 35 U.S.C. 154(b) by 930 days.

(21) Appl. No.: 10/654,752

(22) Filed: Sep. 3, 2003

(65) Prior Publication Data

US 2007/0144582 A1   Jun. 28, 2007

Related U.S. Application Data

(60) Provisional application No. 60/408,098, filed on Sep. 3, 2002.

(51) Int. Cl.
  *B05B 9/00* (2006.01)
(52) U.S. Cl. .................. 137/883; 405/41; 239/DIG. 15
(58) Field of Classification Search ................ 137/883, 137/884; 405/36, 41, 51; 239/DIG. 15
  See application file for complete search history.

(56) References Cited

U.S. PATENT DOCUMENTS

| | | | |
|---|---|---|---|
| 1,267,651 A | 5/1918 | Ford | |
| 1,696,757 A | 12/1928 | Ford | |
| 2,569,432 A * | 9/1951 | Halford | 137/552.7 |
| 2,576,630 A | 11/1951 | Mueller et al. | |
| 2,598,961 A * | 6/1952 | Andrus | 137/883 |
| 3,511,524 A | 5/1970 | Ford et al. | |
| 4,183,484 A | 1/1980 | Mathews | |
| 4,819,877 A * | 4/1989 | Ciccolallo et al. | 239/266 |
| 4,834,143 A * | 5/1989 | Bayat | 137/899 |
| 4,913,183 A | 4/1990 | Vogel et al. | |
| 4,949,905 A * | 8/1990 | Jones et al. | 239/279 |
| 5,392,803 A | 2/1995 | Bruce | |
| 5,487,406 A | 1/1996 | Jirasek | |
| 5,984,574 A | 11/1999 | Sinclair | |
| 5,988,943 A | 11/1999 | McCord | |
| 6,076,778 A | 6/2000 | Brown | |
| 6,273,123 B1 | 8/2001 | Keefer et al. | |
| 6,460,563 B2 * | 10/2002 | Olson et al. | 137/364 |
| 6,827,288 B2 * | 12/2004 | Noelke | 239/124 |
| 6,834,662 B1 * | 12/2004 | Olson et al. | 137/15.18 |
| 7,004,677 B1 * | 2/2006 | Ericksen et al. | 407/51 |

* cited by examiner

*Primary Examiner*—John Fox
(74) *Attorney, Agent, or Firm*—Kelly, Lowry & Kelley LLP (57) ABSTRACT

A one-piece manifold for use in a sprinkler valve assembly includes an intake pipe having a water inlet and a plurality of ports adapted for fluid connection to inlets of a plurality of respective sprinkler valve assemblies. An outlet is attached to the intake, such as by cross-beams, and includes a plurality of elbow segments which are non-fluidly connected to one another. Each elbow segment defines an intake port adapted to be fluidly connected to an outlet of the respective valve assemblies. An exhaust port is adapted to be fluidly connected to a sprinkler or irrigation line. Preferably, the manifolds are connectable to one another in series to accommodate any number of sprinkler lines.

23 Claims, 7 Drawing Sheets

SPRINKLER VALVE MANIFOLD

RELATED APPLICATION

This application claims priority from U.S. Provisional Application Ser. No. 60/408,098, filed Sep. 3, 2002.

BACKGROUND OF THE INVENTION

The present invention generally relates to irrigation and sprinkler systems. More particularly, the present invention relates to a one-piece, multi-line water manifold for use in sprinkler systems.

The installation of anti-siphon valves for the purpose of sprinkler irrigation has been a messy and time consuming process. Currently, the installer must purchase the necessary components such as T-segments, elbow segments, and straight segments of PVC pipe in an amount corresponding to the number of valves to be installed. For example, if installing four valves, this would require purchasing three T-segments, five elbow segments, and cutting to length three pieces of PVC pipe.

All of the components must then be glued together and placed in proper alignment and proper spacing. This would include setting the proper alignment and glueing the T-segments and one elbow segment together. Should the glue dry before proper alignment is achieved, the piece must be cut off and replaced with new components. When assembling these components, all rough edges must also be removed, adding to the time and complexity of the project.

In the event that the earth surrounding the installed components is moved, individual pieces can possibly move in opposite directions and cause stress and possible breakage.

Accordingly, there is a continuing need for a one-piece, multi-valve water manifold system for sprinkler valves to eliminate the aforementioned disadvantages and drawbacks. The present invention fulfills these needs and provides other related advantages.

SUMMARY OF THE INVENTION

The present invention resides in a manifold for use in a sprinkler valve assembly. The manifold is of one-piece construction for use in multi-valve sprinkler assemblies.

Generally, the manifold comprises an intake including a pipe having a water inlet and a plurality of ports, typically disposed generally transverse to a longitudinal axis of the pipe, adapted to be fluidly connected to inlets of a plurality of respective sprinkler valve assemblies. Typically, the intake ports are connected to intake risers of the sprinkler valve assembly. This connection may be threaded.

An outlet is attached to the intake by cross-beams and has a plurality of elbow segments which are non-fluidly connected to one another, typically with additional cross-beams. Each elbow segment defines an intake port adapted to be fluidly connected to an outlet of a respective valve assembly. Typically, the intake ports of the elbows are connected with outlet risers of the sprinkler valve assembly. Such connection can be threaded. Each elbow segment also defines an exhaust port adapted to be fluidly connected to a sprinkler or irrigation line.

The manifolds can be designed to accommodate a two line assembly, three line assembly, four line assembly, etc. In a particularly preferred embodiment, the manifolds are connectable to one another in series to accommodate sprinkler valve assemblies of any number of lines. Such can be accomplished by configuring an end of the intake piper generally opposite the water inlet to be mated with a water inlet end or pipe extension of an adjoining manifold.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings for purposes of illustration, the present invention resides in a unique sprinkler valve assembly, referred to in the figures by the reference numbers 10, 10' and 10", and more particularly to a one-piece manifold referred to in the drawings by the reference numbers 12, 12' and 12", which properly aligns and provides adequate distance setting of the valves and lines, as will be explained more fully herein. The present invention overcomes the needs to purchase and install by proper alignment and distance the various necessary components such as t-segments, elbow segments, straight segments of PVC pipe in an amount corresponding to the balance to be installed. The present invention also accommodates the movement of earth which can stress and break prior art valve assemblies.

In the following description, a two-line manifold 12, a three-line manifold 12' and a four-line manifold 12" are illustrated. The two-line manifold 12 and sprinkler valve assembly 10 will be described, corresponding structure in the other embodiments being labeled accordingly. It should be understood by one skilled in the art that the present invention is not limited to a pre-set number of lines. In fact, as will be more fully described herein, the manifolds 12 can be linked to one another to accommodate any number of lines.

Figure 1:
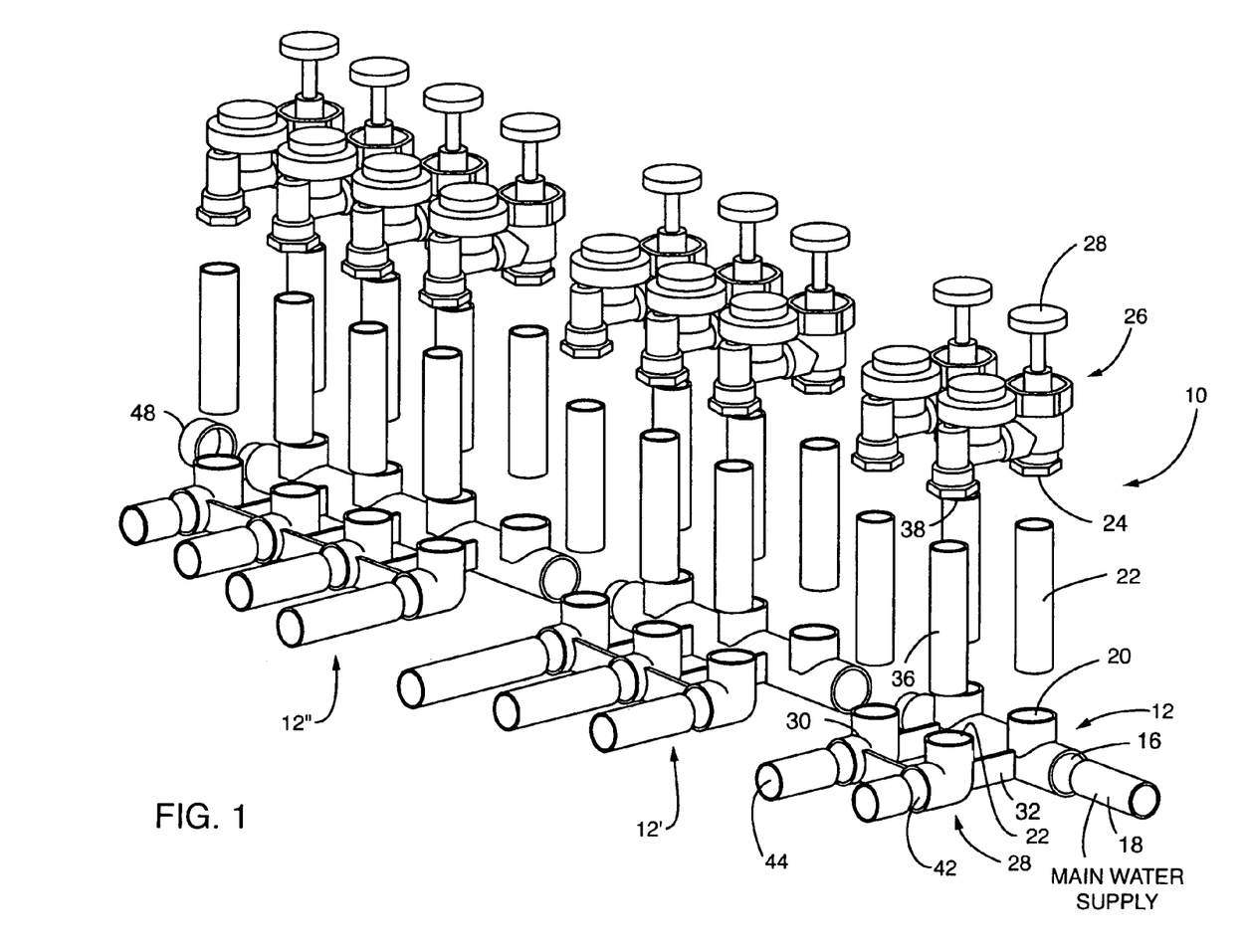
FIG. 1 is an exploded perspective view of a two line, three line, and four line sprinkler valve manifold system embodying the present invention.
Figure 2:
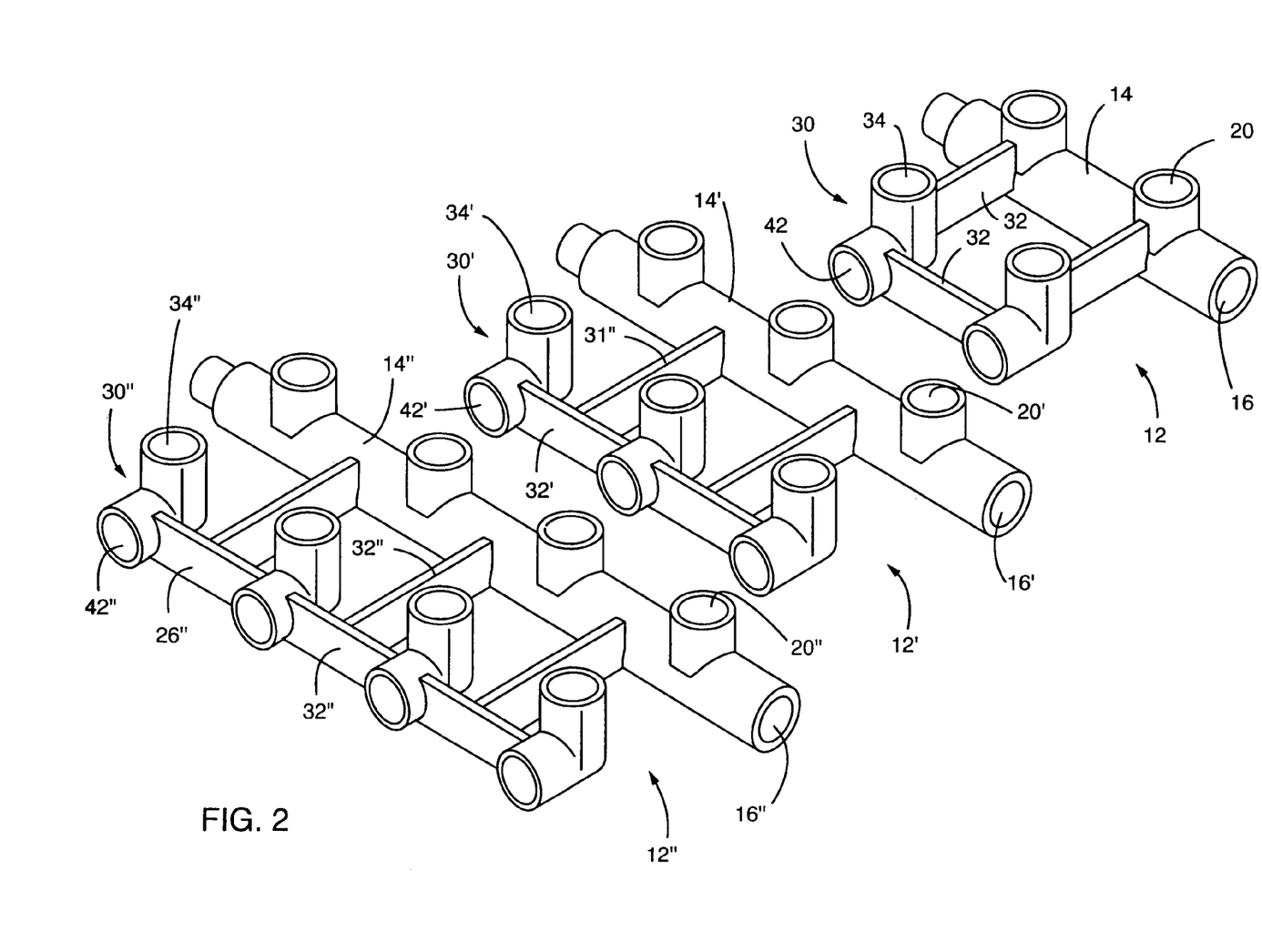
FIG. 2 is a perspective view of each of the manifolds of the systems of FIG. 1.

With reference now to FIGS. 1-4, the manifold 12 is of one-piece construction and includes an intake 14 in the form of a pipe defining a water supply inlet 16. As shown in FIG. 1, the inlet 16 is sized and configured to be mated with a main water supply line pipe 18. The intake pipe 14 defines a plurality of ports 20 which are configured to be connected with intake risers 22, typically predetermined lengths of PVC pipe which fluidly connect the intake pipe 14 with an inlet 24 of a sprinkler valve assembly 26. The number of ports 20 of the intake pipe 14 correspond with the number of sprinkler valve assemblies 26 needed for that particular job. For example, a rather large residential yard may require up to four lines, and thus four valves to control the timing and flow of water to each line. A smaller lot may only require two valves and two lines, however. Off-the-shelf sprinkler valve assemblies 26 may be used which have mechanisms for controlling the flow of water therethrough, such as the illustrated handle 28 which can be selectively opened and closed upon rotation, or more usually electronic components which are linked to a controller which automatically opens and closes the valves according to a timing schedule.

An outlet 28 segment of the manifold comprises a plurality of elbow segments 30 which are non-fluidly connected to one another, such as with the illustrated cross-beams 32. The cross-beams 32 also connect the elbows 30 to the intake pipe portion 14 of the manifold so that the manifold 12 is of one-piece construction and thus the necessary ports, etc. are aligned with one another and properly spaced.

Figure 3:
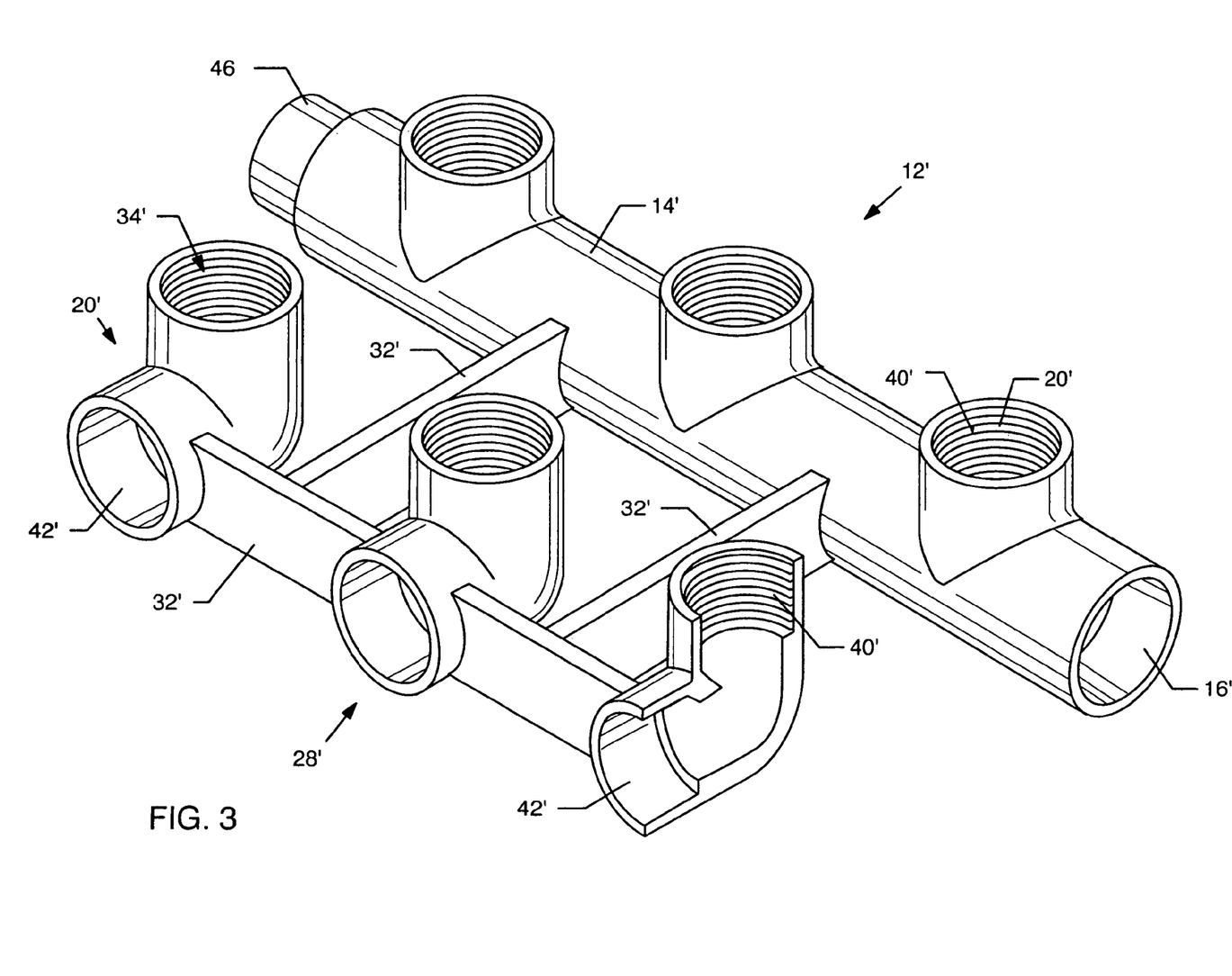
FIG. 3 is a partially sectioned perspective view of a three line manifold used in accordance with the present invention.
Figure 4:
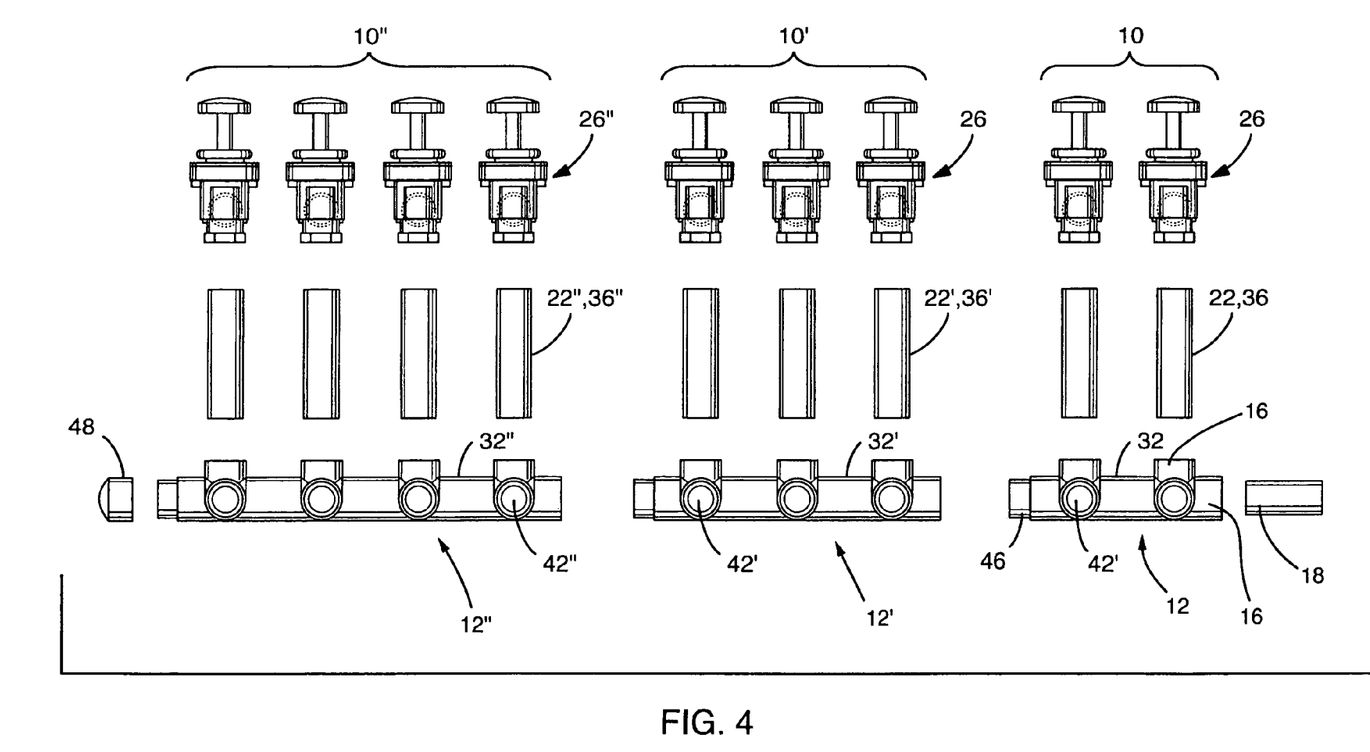
FIG. 4 is a partially exploded front elevational view of the manifolds of FIG. 1.

The elbow segment 30 defines an intake port 34 which is generally aligned with port 20 of the intake pipe 14. The intake port 34 of the elbow segment 30 is sized and configured so as to receive an outlet riser 36 which in turn is connected to an outlet 38 of the valve assembly 26. The outlet riser 36 can be connected to the elbow segment 30 by glue in the traditional manner. Alternatively, as illustrated in FIG. 3, the intake port 34 can include internal threads 40' which threadably receive a threaded end of the outlet riser 36. This allows a water-tight connection to be made very quickly, and allows the manifold 12 to be removed from the various components as necessary. As illustrated in FIG. 3, the intake ports 20 can also include internal threads 40 so that the inlet risers 22 can be threadably connected thereto. Although not illustrated, it is possible that the water inlet aperture 16 or port 20 can also be threaded for threaded connection to the main support water supply line 18 or intake riser 22. The elbow 30 also forms an exhaust port 42 which is configured to accept and be mated with an irrigation or sprinkler outlet line 44. Once again, this connection can be by gluing, threaded connection, or any other well-known connection means.

It will be appreciated by those skilled in the art that the valve assemblies 26 are typically placed above and generally transverse to the main water supply line 18 and outlet lines 44. Thus, the intake ports 20 are generally formed transverse to the water inlet 16 of the intake pipe 14. The intake port 34 and exhaust port 42 of the elbow 30 are similarly transverse, or generally 90° from each other to accommodate this arrangement. This is due to the anti-siphoning and operation of the valve assembly 26.

Figure 5:
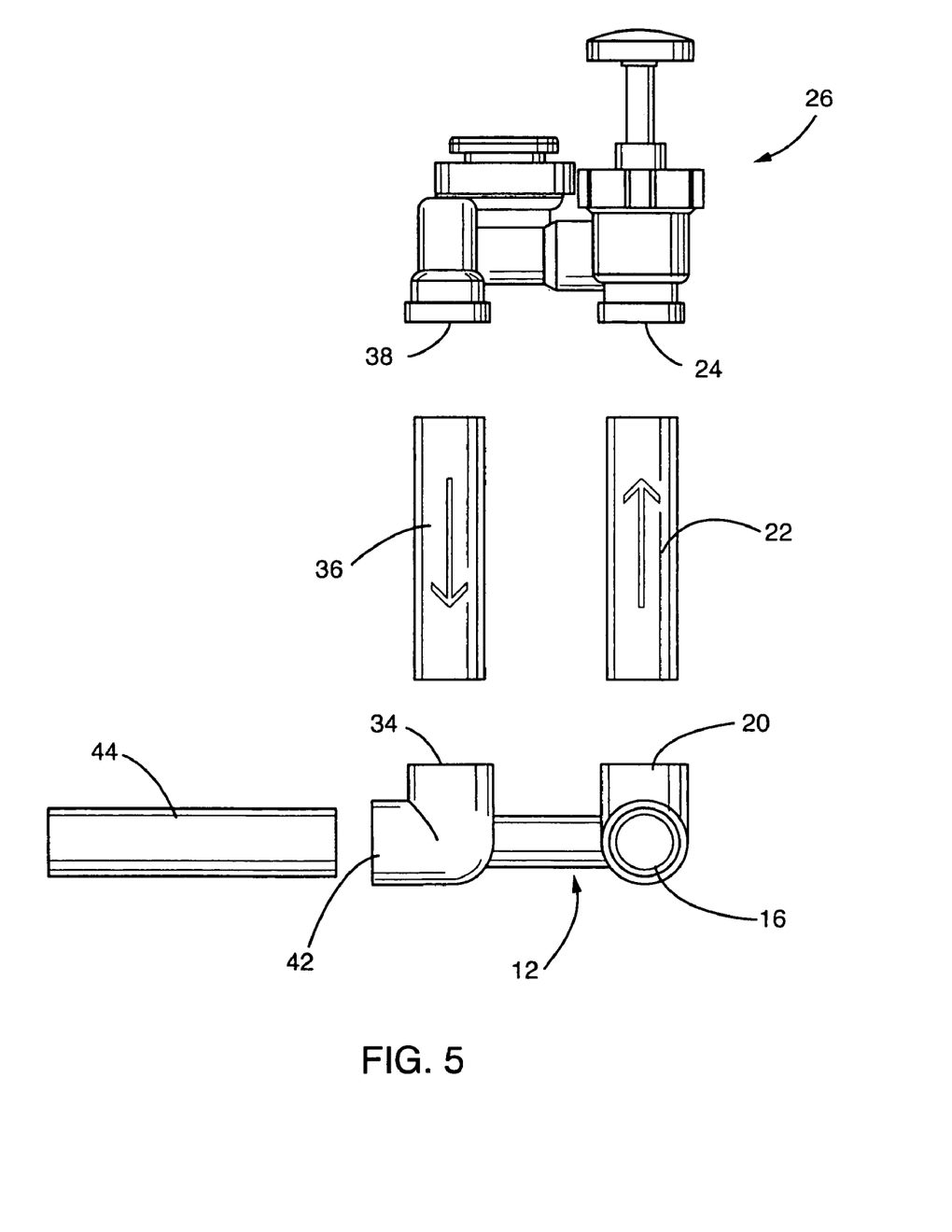
FIG. 5 is a partially exploded side elevational view of a sprinkler valve manifold system embodying the present invention, illustrating water flow therethrough.
Figure 6:
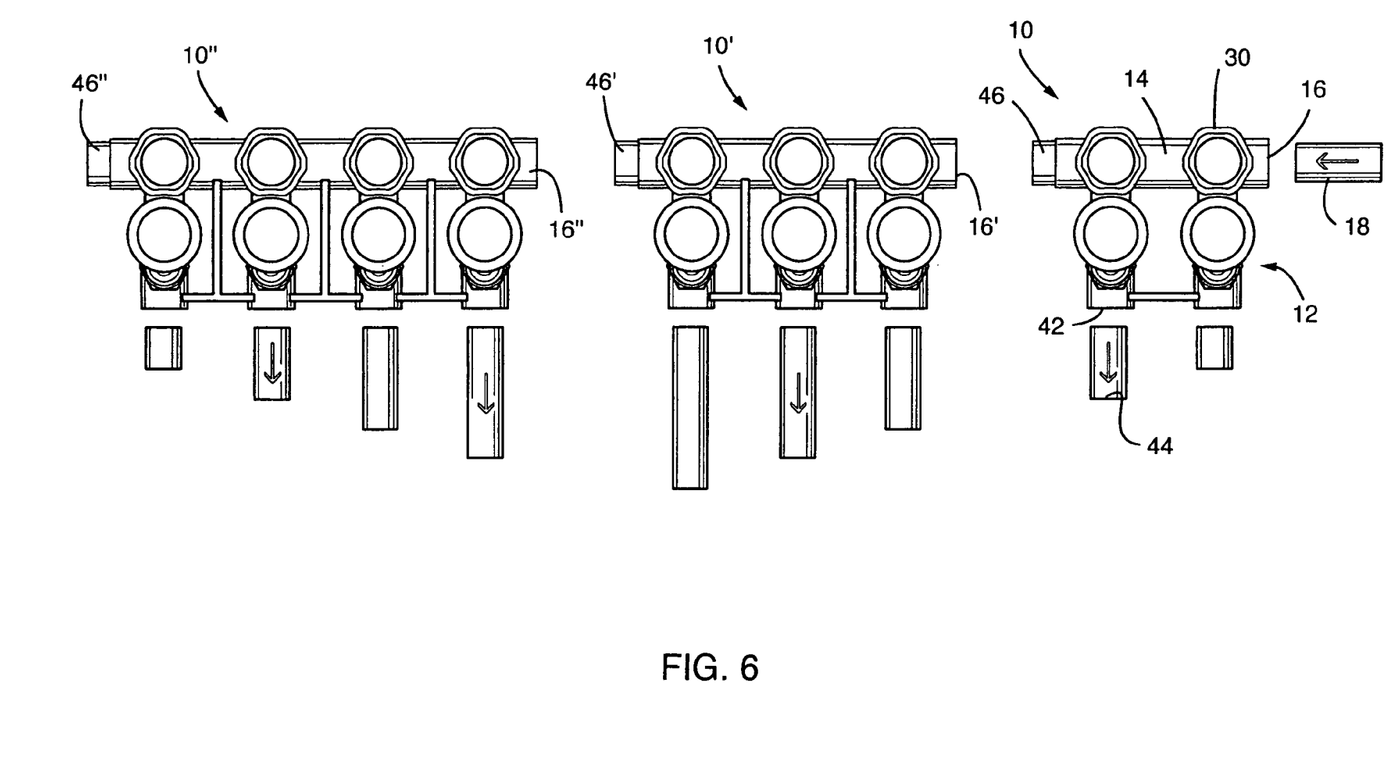
FIG. 6 is a top plan view of three different sprinkler valve manifold systems embodying the present invention, illustrating the flow of water therethrough.

With reference now to FIGS. 5 and 6, the water flows through the main water supply line 18 into inlet 16 of the intake pipe 14 and through port 20 and riser 22 to the inlet 24 of the valve assembly 26. Once the valve has been opened by manual operation or electronic means, the water flows through outlet 38 of the valve assembly 26 into outlet riser 36 and into intake port 34 where it is redirected to exhaust port 42 and out sprinkler line 44. As the first line is shut off by closing a valve within valve assembly 26, another valve can be opened so that an adjacent line can have water fed through in a similar manner. It will be understood by those skilled in the art that the water is usually continuously at inlet 24 of the one or more valve assemblies 26 and under pressure awaiting to be fed through a line 44 by an opening of the respective valve.

Figure 7:
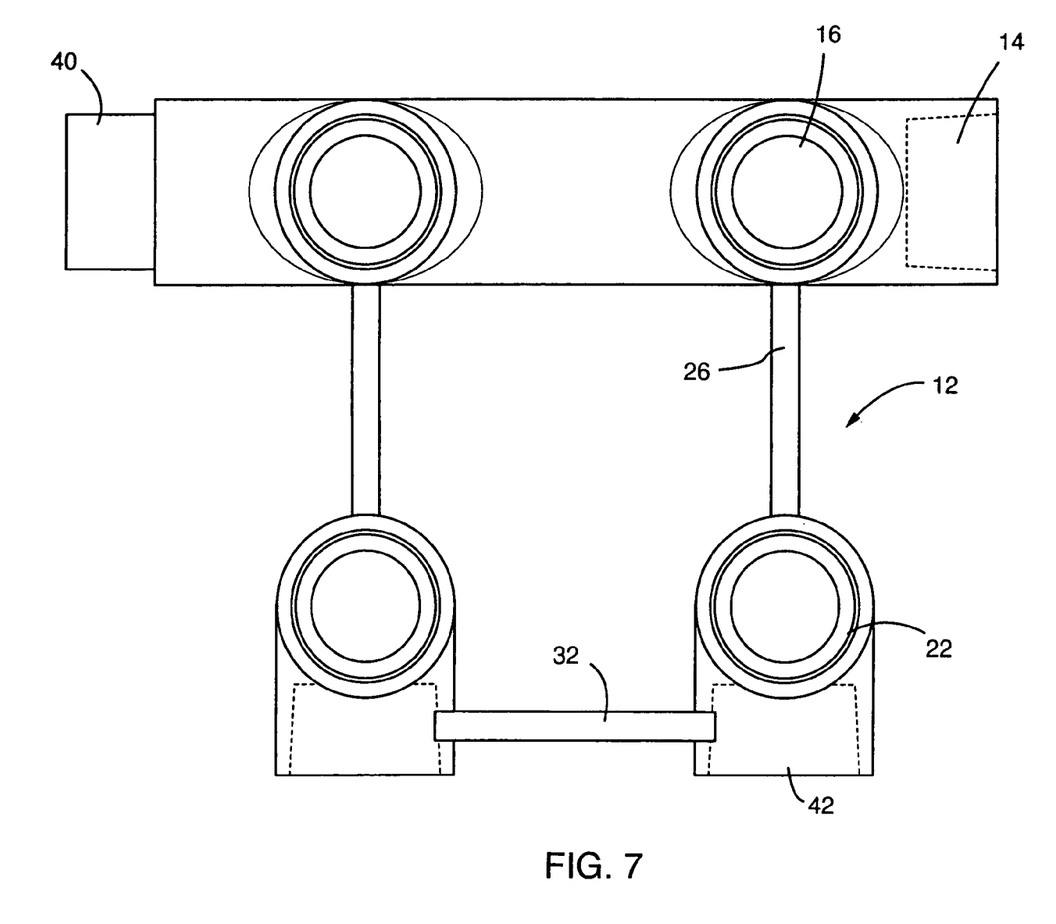
FIG. 7 is a top sectional view of a dual line sprinkler valve manifold system embodying the present invention.

As mentioned above, the manifold 12 can be used alone or in conjunction with other manifolds. With particular reference to FIG. 7, in a particularly preferred embodiment, the water inlet 16 is slightly tapered so as to receive a male end 46 of an adjoining manifold. Typically, the manifolds will be glued to one another. Preferably, the male end 46 is of approximately the same dimension as the water supply inlet line 18 so that the water inlet aperture 16 can accommodate either the main water supply line pipe 18 or the male attachment 46. If the manifolds 12 are to be separated somewhat in distance, the intake aperture 16 can also accept a pipe extending from the adjacent manifold which is being placed in series. Thus, the male end 46 can be used in conjunction with a coupling to act as a feeder to be extended down to another location where another manifold 12 can be added. Preferably, the manifolds 12-12" are manufactured to accommodate a different number of lines, such as the illustrated two, three and four-line manifolds. However, a five-line valve assembly may be required, thus necessitating the attachment of a two-line manifold and a three-line manifold to one another. The incorporation of the tapered male end 46 accommodates such a need. A cap 48 is attached to the male end of the last manifold of the series, or the only manifold being implemented, to maintain the proper water pressure.

It will be appreciated by those skilled in the art that the present invention provides many advantages over the currently used method of installing sprinkler system valves. The provision of a one-piece unit eliminates the need to glue several components together to create a multi-valve system. Proper distance and spacing between the components and valves is also automatically provided, saving time and creating a more professional look to the end product. As the attached components are in proper alignment and distance with respect to one another, the need to make sure of proper alignment of elbows when gluing them in place on each individual valve is eliminated. Also, the manifold of the present invention also provides increased strength and stability against earth movement, greatly reducing the possibility of breakage.

Although several embodiments have been described in detail for purposes of illustration, various modifications may be made without departing from the scope and spirit of the invention. Accordingly, the invention is not to be limited, except as by the appended claims.

What is claimed is:

1. A manifold for use in a sprinkler valve assembly, the manifold comprising:
   an intake comprising a pipe having a water inlet and a plurality of ports adapted to be fluidly connected to respective inlets of a plurality of respective sprinkler valve assemblies; and
   an outlet attached to the intake and having a plurality of elbow segments, each elbow segment defining an intake port adapted to be fluidly connected to an outlet of a respective valve assembly, and an exhaust port adapted to be fluidly connected to a sprinkler or irrigation line.

2. The manifold of claim 1, wherein the intake ports are disposed generally transverse to a longitudinal axis of the pipe.

3. The manifold of claim 1, wherein the intake ports are threadedly connectable to intake risers of the sprinkler valve assembly.

4. The manifold of claim 1, wherein the manifold is connectable in series with adjoining manifolds.

5. The manifold of claim 4, wherein an end of the pipe of the intake generally opposite the water inlet is configured to be mated with an water inlet end or pipe extension of an adjoining manifold.

6. The manifold of claim 1, including cross-beams interconnecting the intake and the outlet.

7. The manifold of claim 1, wherein the plurality of elbows of the outlet are non-fluidly connected.

8. The manifold of claim 7, including cross-beams interconnecting the elbows.

9. The manifold of claim 1, wherein the intake ports of the elbows are threadedly connectable with outlet risers of the sprinkler valve assembly.

10. A sprinkler assembly, comprising:
  a manifold comprising an intake defining a water inlet and a plurality of ports, and an outlet attached to the intake and having a plurality of elbow segments, each elbow segment defining an intake port and an exhaust port adapted to be fluidly connected to a sprinkler or irrigation line;
  a water supply line fluidly connected to the water inlet of the manifold intake;
  a plurality of sprinkler valve assemblies each having an intake riser fluidly connected to a respective port of the manifold intake, and an outlet riser fluidly connected to a respective intake port of an elbow segment of the manifold outlet; and
  a plurality of water outlet lines fluidly coupled to respective exhaust ports of the elbow segments of the manifold exhaust.

11. The manifold of claim 10, wherein the intake ports are disposed generally transverse to a longitudinal axis of the pipe.

12. The manifold of claim 10, wherein the intake ports are threadedly connectable to intake risers of the sprinkler valve assembly.

13. The manifold of claim 10, wherein the manifold is connectable in series with adjoining manifolds.

14. The manifold of claim 13, wherein an end of the pipe of the intake generally opposite the water inlet is configured to be mated with an water inlet end or pipe extension of an adjoining manifold.

15. The manifold of claim 10, including cross-beams interconnecting the intake and the outlet.

16. The manifold of claim 10, wherein the plurality of elbows segments of the outlet are non-fluidly connected.

17. The manifold of claim 16, including cross-beams interconnecting the elbow segments.

18. The manifold of claim 10, wherein the intake ports of the elbow segments are threadedly connectable with outlet risers of the sprinkler valve assembly.

19. A manifold for use in a sprinkler valve assembly, the manifold comprising:
  an intake comprising a pipe having a water inlet and a plurality of ports disposed generally transverse to a longitudinal axis of the pipe and adapted to be fluidly connected to respective inlets of a plurality of respective sprinkler valve assemblies; and
  an outlet attached to the intake by cross-beams and having a plurality of elbow segments which are non-fluidly connected, each elbow segment defining an intake port adapted to be fluidly connected to an outlet of a respective valve assembly, and an exhaust port adapted to be fluidly connected to a sprinkler or irrigation line.

20. The manifold of claim 19, wherein the intake ports are threadedly connectable to intake risers of the sprinkler valve assembly.

21. The manifold of claim 19, wherein the manifold is connectable in series with adjoining manifolds.

22. The manifold of claim 21, wherein an end of the pipe of the intake generally opposite the water inlet is configured to be mated with an water inlet end or pipe extension of an adjoining manifold.

23. The manifold of claim 19, wherein the intake ports of the elbows are threadedly connectable with outlet risers of the sprinkler valve assembly.

* * * * *